US012576606B2

(12) United States Patent
Ishihara

(10) Patent No.: US 12,576,606 B2
(45) Date of Patent: Mar. 17, 2026

(54) MOLD FOR FORMING A TIRE AND TIRE PRODUCTION METHOD

(71) Applicant: BRIDGESTONE CORPORATION, Tokyo (JP)

(72) Inventor: Yasuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 130 days.

(21) Appl. No.: 18/563,161

(22) PCT Filed: Nov. 24, 2021

(86) PCT No.: PCT/JP2021/043044
§ 371 (c)(1),
(2) Date: Nov. 21, 2023

(87) PCT Pub. No.: WO2022/269939
PCT Pub. Date: Dec. 29, 2022

(65) Prior Publication Data
US 2024/0217194 A1 Jul. 4, 2024

(30) Foreign Application Priority Data
Jun. 22, 2021 (JP) ................................. 2021-103645

(51) Int. Cl.
*B29D 30/06* (2006.01)

(52) U.S. Cl.
CPC .. *B29D 30/0629* (2013.01); *B29D 2030/0612* (2013.01)

(58) Field of Classification Search
CPC ............ B29D 30/0601; B29D 30/0606; B29D 30/0629; B29D 30/0662; B29D 2030/0607; B29D 2030/0612; B29D 2030/0631

(Continued)

(56) References Cited

U.S. PATENT DOCUMENTS 4,895,692 A 1/1990 Laurent et al.
7,025,581 B2 4/2006 Kata
(Continued)

FOREIGN PATENT DOCUMENTS

EP 1415781 A1 5/2004
JP S62270308 A 11/1987
(Continued)

OTHER PUBLICATIONS

Kaijima Katsuichi, JP-2003326524-A machine translation. (Year: 2003).*

(Continued)

*Primary Examiner* — Sedef E Paquette
(74) *Attorney, Agent, or Firm* — KENJA IP LAW PC

(57) ABSTRACT

Provided are a mold for forming a tire including an annular tread molding part which is configured to be opened and closed by moving a plurality of segments in a radial direction, and a tire production method using the same. In the mold for forming the tire, each of the segments includes a plurality of design surface dividing mold parts, each of the plurality of the design surface dividing mold parts includes a tread design surface for forming a tread of a tire, the plurality of the design surface dividing mold parts are arranged in a circumferential direction of the segments, and the plurality of the design surface dividing mold parts are configured to rotate around a rotatable shaft parallel to an axis of the tread molding part when the tread molding part is opened after vulcanization molding of the tire.

5 Claims, 7 Drawing Sheets

(58) Field of Classification Search
USPC ........................................................ 425/28.1
See application file for complete search history.

(56) References Cited

U.S. PATENT DOCUMENTS

| | | | |
|---|---|---|---|
| 7,201,570 | B2 | 4/2007 | Ohara |
| 7,572,120 | B2 | 8/2009 | Ouyahia et al. |
| 2006/0008547 | A1 | 1/2006 | Ohara |
| 2008/0152742 | A1* | 6/2008 | Bachochin ......... B29D 30/0629 |
| | | | 425/46 |

FOREIGN PATENT DOCUMENTS

| | | | |
|---|---|---|---|
| JP | 2000326332 | A | 11/2000 |
| JP | 2000334740 | A | 12/2000 |
| JP | 2003326524 | A * | 11/2003 |
| JP | 2006021357 | A | 1/2006 |
| JP | 2009149079 | A | 7/2009 |
| KR | 1020010098140 | A | 11/2001 |
| WO | 03008169 | A1 | 1/2003 |

OTHER PUBLICATIONS

Jan. 25, 2022, International Search Report issued in the International Patent Application No. PCT/JP2021/043044.

Dec. 14, 2023, International Preliminary Report on Patentability issued in the International Patent Application No. PCT/JP2021/043044.

Sep. 26, 2024, search result of the Extended European Search Report issued by the European Patent Office in the corresponding European Patent Application No. 21947218.0.

* cited by examiner

MOLD FOR FORMING A TIRE AND TIRE PRODUCTION METHOD

TECHNICAL FIELD

This disclosure relates to a mold for forming a tire and a tire production method.

BACKGROUND

In a known conventional mold for forming a tire for use in vulcanization molding of an unvulcanized raw tire to produce a tire, it is known that an annular tread molding part (a tread mold) for forming a tread of a tire is divided into a plurality of segments arranged in a circumferential direction and is configured to be opened and closed by moving each of the segments in a radial direction (for example, see PTLs 1 to 3).

CITATION LIST

Patent Literature

PTL 1: JP 2000-326332 A
PTL 2: JP 2000-334740 A
PTL 3: JP 2009-149079 A

SUMMARY

Technical Problem

In the above-described conventional mold for forming a tire described above, the tread design surface oriented toward the radially inner side of each of the segments is typically provided with projections such as ribs or blades protruding from the tread design surface toward a radially inner side, in order to form a tread pattern with recesses and protrusions consisting of, for example, grooves and sipes on a tread of the formed tire.

However, in the configuration where the tread design surface is provided with the projections, when the tire is released from the tread molding part by moving the segments toward the radially outer side after vulcanization molding, high undercut resistance of the tread is caused by the projections, especially on the sides of both ends of the segments in a circumferential direction. Therefore, in the case of, for example, forming a tire having a complex tread pattern, defects such as permanent deformation in the tread of the tire after the mold releasing and the failure of the projections can be caused by excessively high undercut resistance described above.

This disclosure has been accomplished in view of the above-described problem and it is an object of this disclosure to provide a mold for forming a tire and a tire production method which can reduce undercut resistance of the tread caused by the projections in mold releasing of the tire.

Solution to Problem

The mold for forming the tire of this disclosure is a mold for forming a tire for vulcanization molding of an unvulcanized raw tire into a tire, the mold including an annular tread molding part which is divided into a plurality of segments arranged in a circumferential direction and which is configured to be opened and closed by moving each of the segments in a radial direction, wherein each of the segments includes a plurality of design surface dividing mold parts, each of the plurality of the design surface dividing mold parts includes a tread design surface for forming a tread of the tire, the plurality of the design surface dividing mold parts are arranged in a circumferential direction of the segments, and the plurality of the design surface dividing mold parts are configured to rotate around a rotatable shaft parallel to an axis of the tread molding part when the tread molding part is opened after vulcanization molding of the tire.

In an embodiment, the mold for forming the tire of this disclosure can be configured in such a way that each of the segments includes a holder to be driven toward a radially outer side by a container when the tread molding part is opened, and each of the plurality of the design surface dividing mold parts is supported by the rotatable shaft to be rotatable in relation to the holder.

In an embodiment, the mold for forming the tire of this disclosure can be configured to include two pieces of the design surface dividing mold parts, wherein the rotatable shaft corresponding to one of the design surface dividing mold parts is disposed on the side of one end of the holder in a circumferential direction, and the rotatable shaft corresponding to the other of the design surface dividing mold parts is disposed on the side of the other end of the holder in a circumferential direction.

In an embodiment, the mold for forming the tire of this disclosure can be configured in such a way that the design surface dividing mold part includes a back board portion, and a pair of side board portions extending from both ends of the back board portion in a direction of the axis toward a radially inner side, and is supported by the rotatable shaft at the back board portion.

In an embodiment, the mold for forming the tire of this disclosure can be configured to include a spring member which is attached between the design surface dividing mold part and the holder corresponding to the spring members to retain the design surface dividing mold parts corresponding to the spring members at predetermined positions, and elastically deform to allow for rotation of the design surface dividing mold parts in relation to the holder when the tread molding part is opened.

The tire production method of this disclosure is a tire production method for vulcanization molding of an unvulcanized raw tire to produce a tire by using a mold for forming a tire including an annular tread molding part which is divided into a plurality of segments arranged in a circumferential direction and which is configured to be opened and closed by moving each of the segments in a radial direction, wherein when each of the segments is moved toward a radially outer side to open the tread molding part, the tire is released from the tread molding part with each of a plurality of design surface dividing mold parts provided in the segments in a circumferentially arranged manner being rotated around a rotatable shaft parallel to an axis of the tread molding part.

Advantageous Effect

This disclosure can provide a mold for forming a tire and a tire production method which can reduce undercut resistance of the tread caused by the projections in mold releasing of the tire.

DETAILED DESCRIPTION

Figure 1:
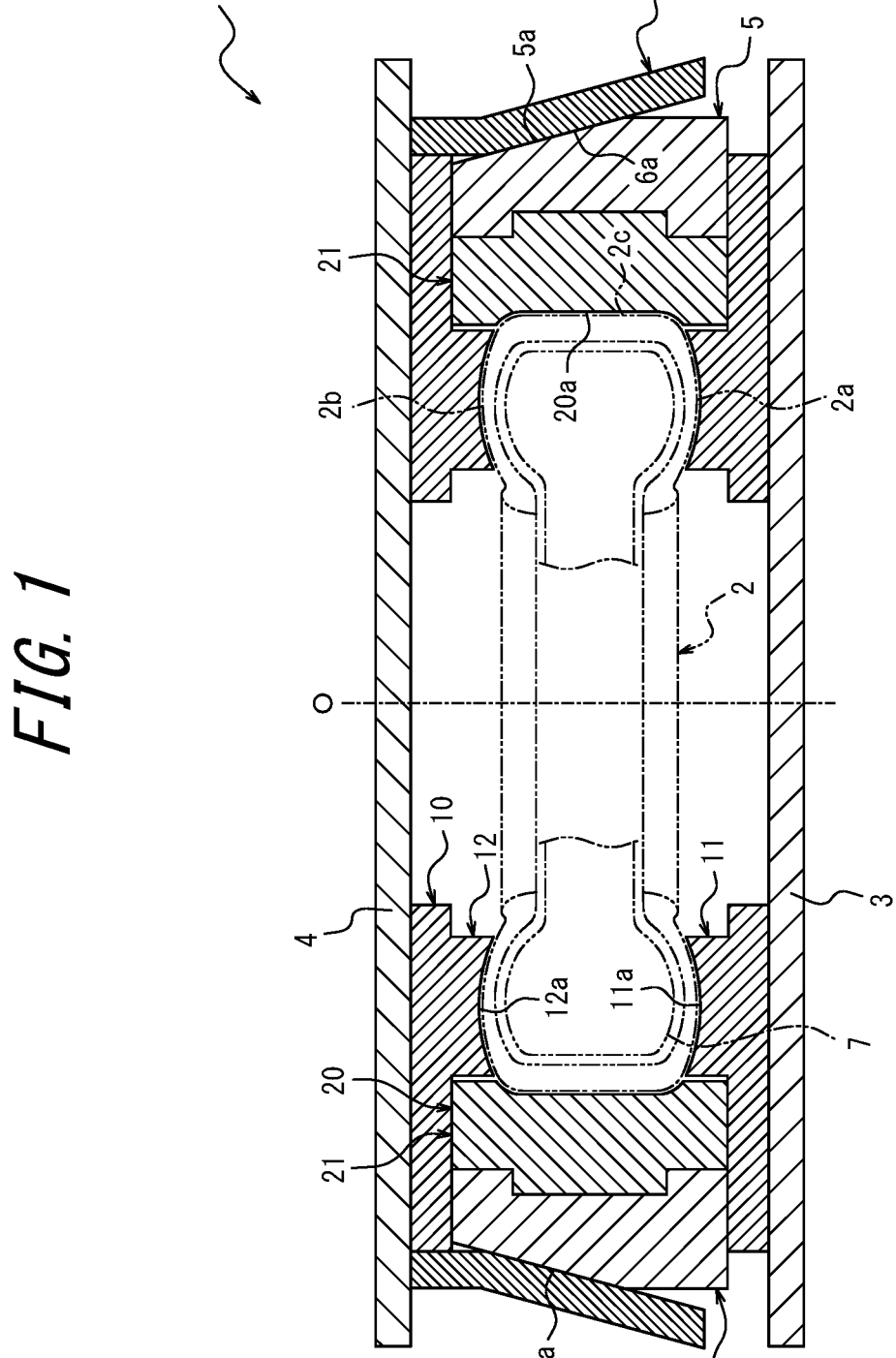
FIG. 1 is a cross-sectional view of a mold for forming a tire according to an embodiment of this disclosure, which is illustrated in a front view.

By way of example, a mold for forming a tire and a tire production method according to an embodiment of this disclosure will now be described in detail with reference to the drawings. In this regard, common members and portions appearing in the drawings have the same reference signs.

A mold for forming a tire 1 illustrated in FIG. 1 according to an embodiment of this disclosure is for use in forming an unvulcanized (before vulcanization) raw tire based on a synthetic rubber into a predetermined shape with the raw tire being vulcanized to produce a tire 2.

In this regard, the tire 2 is a hollow tire based on a synthetic rubber including a pair of sidewalls 2a, 2b and a tread 2c, and is shaped to provide the interior of the tire 2 with a space for filling of a gas such as air or nitrogen.

The mold for forming the tire 1 includes a sidewall molding part 10 and a tread molding part 20.

For example, the sidewall molding part 10 can include an annular lower sidewall molding part 11 fixed to a top surface of a lower container 3, and an annular upper sidewall molding part 12 fixed to a bottom surface of an upper container 4.

Figure 3:
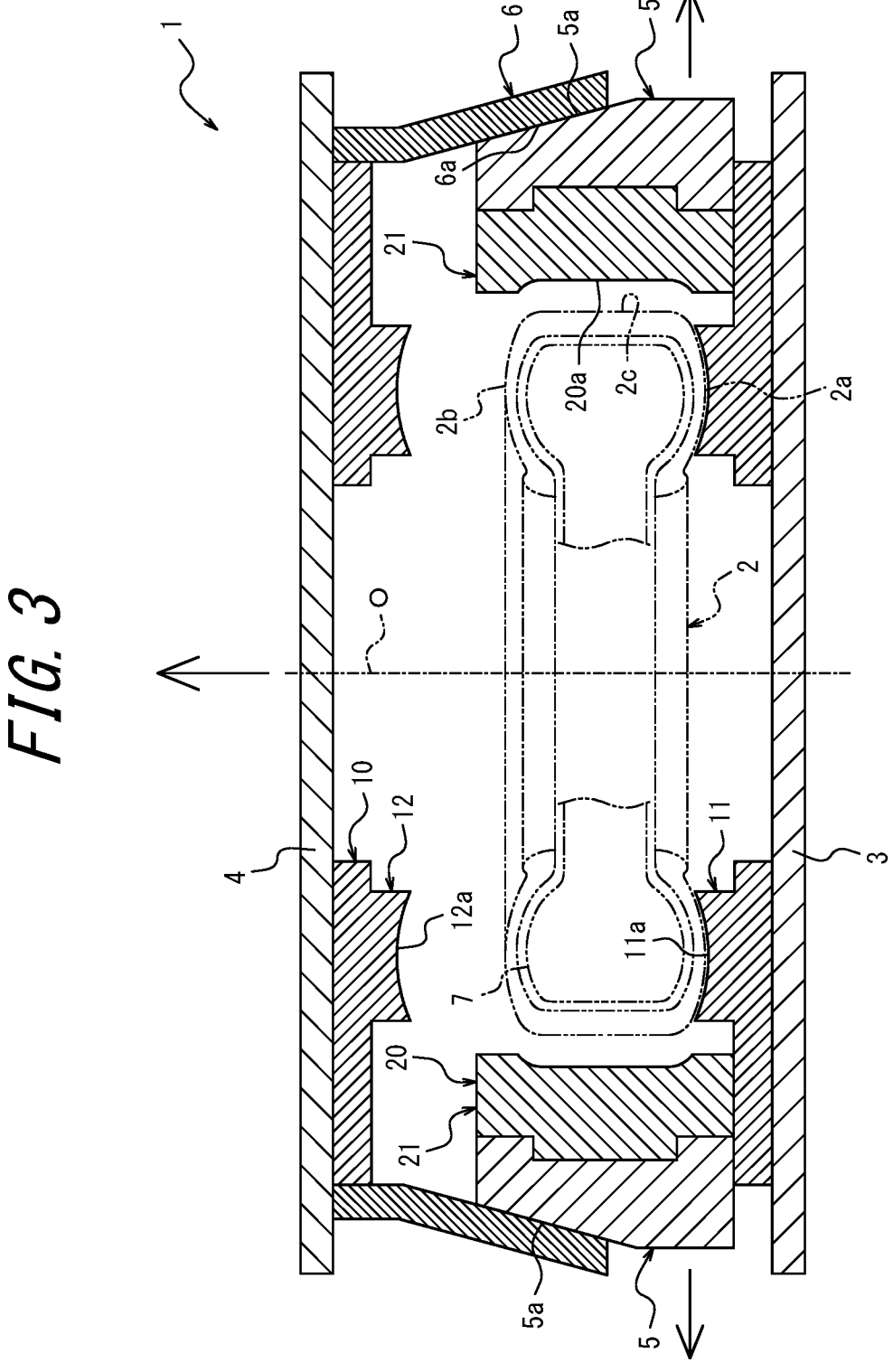
FIG. 3 is a cross-sectional view of the mold for forming the tire illustrated in FIG. 1 when the mold for forming the tire is opened, which is illustrated in a front view.

The sidewall molding part 10 can dispose (accommodate) an annular tire 2 or a raw tire between the lower sidewall molding part 11 and the upper sidewall molding part 12 to be in an orientation by which the central axis of the raw tire becomes coaxial with the central axis O of the sidewall molding part 10. The lower sidewall molding part 11 includes a lower sidewall design surface 11a, which is in the form of a ring around the central axis O and is oriented toward the upward direction. The lower sidewall molding part 11 can form an outer surface of a sidewall 2a of one of the tire 2 or the raw tire (any of which is oriented toward the downward direction in FIG. 1) by the lower sidewall design surface 11a. Similarly, the upper sidewall molding part 12 includes an upper sidewall design surface 12a, which is in the form of a ring around the central axis O and is oriented toward the downward direction. The upper sidewall molding part 12 can form an outer surface of a sidewall 2b of the other of the tire 2 or the raw tire (any of which is oriented toward the upward direction in FIG. 1) by the upper sidewall design surface 12a. As illustrated in FIG. 3, by moving the upper container 4 upwardly (the direction in which the upper container 4 and the lower container 3 is moved away from each other along the central axis of the tire 2) and relatively to the lower container 3, the sidewall molding part 10 is opened and the tire 2 is released from the sidewall molding part 10. By moving the upper container 4 downwardly to its original position illustrated in FIG. 1, the sidewall molding part 10 in an opened configuration is closed to allow for forming of the tire 2 or the raw tire.

In this regard, modifications can be made to the configuration of the sidewall molding part 10 as appropriate, and examples of such modifications include a configuration in which the sidewall molding part 10 is opened by moving the lower container 3 downwardly and relatively to the upper container 4.

The tread molding part 20 is annular and coaxial with the sidewall molding part 10 and is disposed adjacent to a radially outer side of the lower sidewall molding part 11 and the upper sidewall molding part 12. The inner circumferential surface oriented toward the radially inner side of the tread molding part 20 is a tread design surface 20a for forming an outer circumferential surface of the tread 2c of the tire 2.

Figure 2:
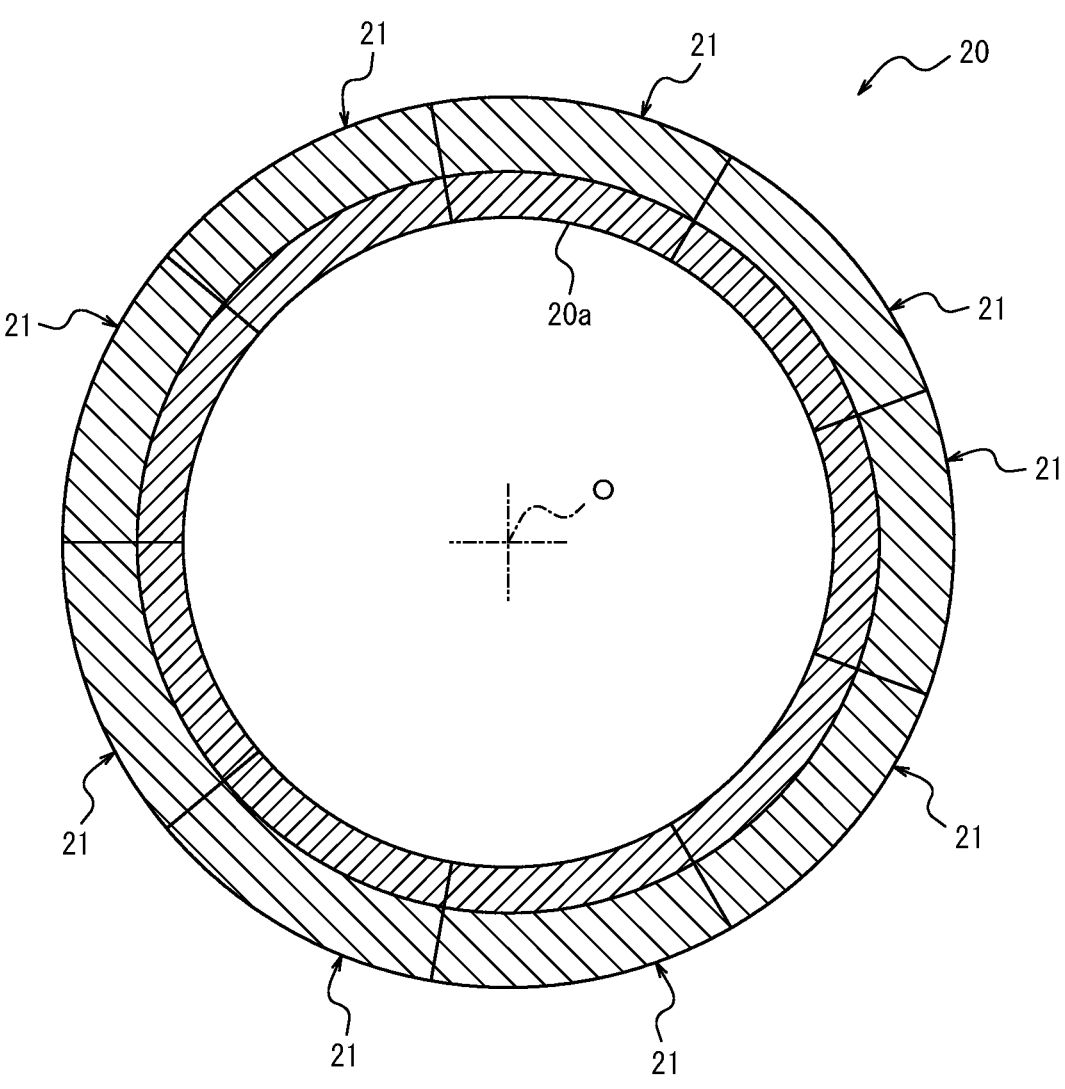
FIG. 2 is a cross-sectional view of the tread molding part illustrated in FIG. 1, which is illustrated in a planar view.

As illustrated in FIG. 2, the tread molding part 20 is divided into a plurality of segments 21 arranged in a circumferential direction. Each of the segments 21 is in the form of arc in a planar view and the segments 21 are combined in a circumferentially arranged manner to constitute a tread molding part 20, which is an annular mold as a whole. In this embodiment, the tread molding part 20 is divided into nine segments 21 having the same length in a circumferential direction. In this regard, the division number of the tread molding part 20 in a circumferential direction is preferably, but not limited to, 7 to 13 and can be changed as appropriate.

As illustrated in FIG. 1, an outer circumferential surface, oriented toward the radially outer side, of each of the segments 21 is fixed to the interior of intermediate container 5 corresponding to each of the segments 21, and each of the segments 21 is driven by the intermediate container 5 to move toward a radial direction centered on the axis of the tread molding part 20 (central axis O). The tread molding part 20 can be opened and closed by moving each of the segments 21 in a radial direction.

More particularly, the outer circumferential surface of the intermediate container 5 oriented toward the radially outer side is provided with a tapered surface 5a inclined in such a way that the outer diameter of the tapered surface 5a gradually becomes smaller toward the upward direction. To the bottom surface of the upper container 4, an annular outer ring 6 disposed on the radially outer side of the intermediate container 5 is fixed. The inner circumferential surface of the outer ring 6 oriented toward the radially inner side is provided with a tapered surface 6a inclined in such a way that the outer diameter of the tapered surface 6a gradually becomes smaller toward the upward direction. The outer ring 6 is coupled with each of the intermediate containers 5, for example, by using a guide member (not illustrated) in such a way that the tapered surface 6a slides along the tapered surface 5a of the intermediate container 5 in an up-down direction.

Figure 4:
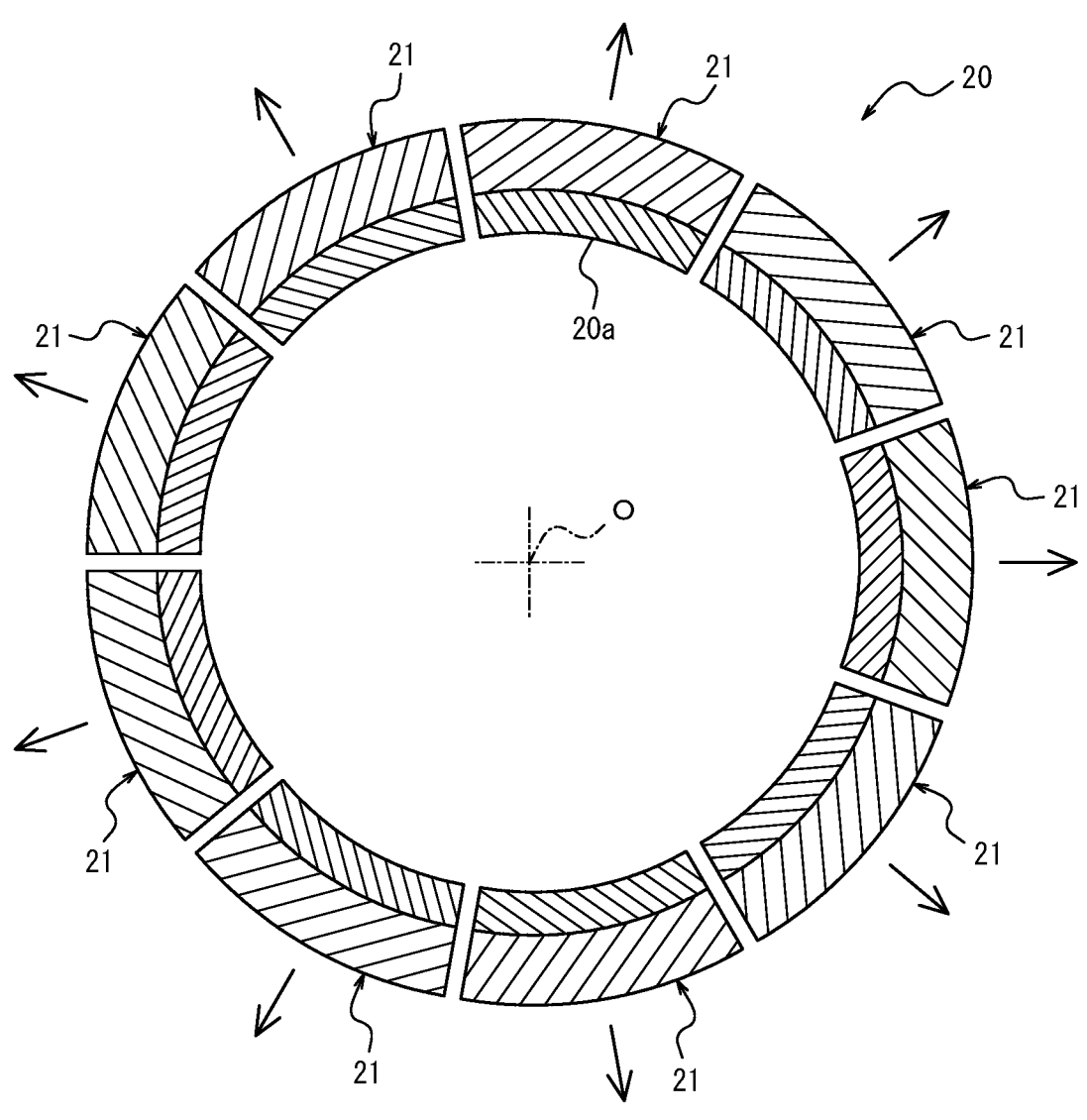
FIG. 4 is a cross-sectional view of the tread molding part illustrated in FIG. 1 when the tread molding part is opened, which is illustrated in a planar view.

When upper container 4 is moved upwardly and relatively to the lower container 3, the outer ring 6 is moved upwardly to each of the intermediate containers 5 with the tapered surface 6a being sliding along the tapered surface 5a of the intermediate container 5. As a result of this, as illustrated in FIG. 3, each of the intermediate containers 5 is moved toward the radially outer side centered on the axis of the tread molding part 20. When each of the intermediate containers 5 is moved toward the radially outer side centered on the axis of the tread molding part 20, as illustrated in FIGS. 3 and 4, each of the segments 21 is driven by an intermediate container 5 corresponding to each of the segments 21 to move, together with the intermediate container 5, toward the radially outer side. As a result of this, the tread molding part 20 is opened to be in a position at which the tread design surface 20a is separated from the tread 2c of the tire 2 or the raw tire. In this regard, the tread molding part 20 can be configured in such a way that, after the tread molding part 20 is opened as described above, the tread molding part 20 suspended by the outer ring 6 is moved upwardly together with the upper container 4 to a position (an upper position in relation to the position illustrated in FIG. 3) at which the tire 2 after forming can be removed. When the upper container 4 is moved downwardly to its original position illustrated in FIG. 1, the tread molding part 20 is moved downwardly to a position adjacent to the lower sidewall molding part 11. Subsequently, the outer ring 6 is moved downwardly in relation to each of the intermediate containers 5, and each of the intermediate containers 5 is moved toward the radially inner side centered on the axis of the tread molding part 20. As a result of this, as illustrated in FIGS. 1 and 2, each of the segments 21 is driven by the intermediate container 5 corresponding to each of the segments 21 to move, together with the intermediate container 5, toward the radially inner side, and the tread molding part 20 is closed to allow for forming of the tire 2 or the raw tire.

As described above, in the mold for forming the tire 1 of this embodiment, the annular tread molding part 20 is divided into a plurality of segments 21 arranged in a circumferential direction, and is configured to be opened and closed by moving each of the segments 21 in a radial direction.

The opening and closing mechanism of the tread molding part 20 is not limited to a configuration using the outer ring 6 but various configurations can be employed.

The mold for forming the tire 1 includes a bladder 7 which is disposed in the interior of the raw tire and expanded by supplying of pressurized steam. Also, the mold for forming the tire 1 includes a heater (not illustrated) for heating the sidewall molding part 10 and the tread molding part 20. The location of the heater can be determined as appropriate.

Figure 5:
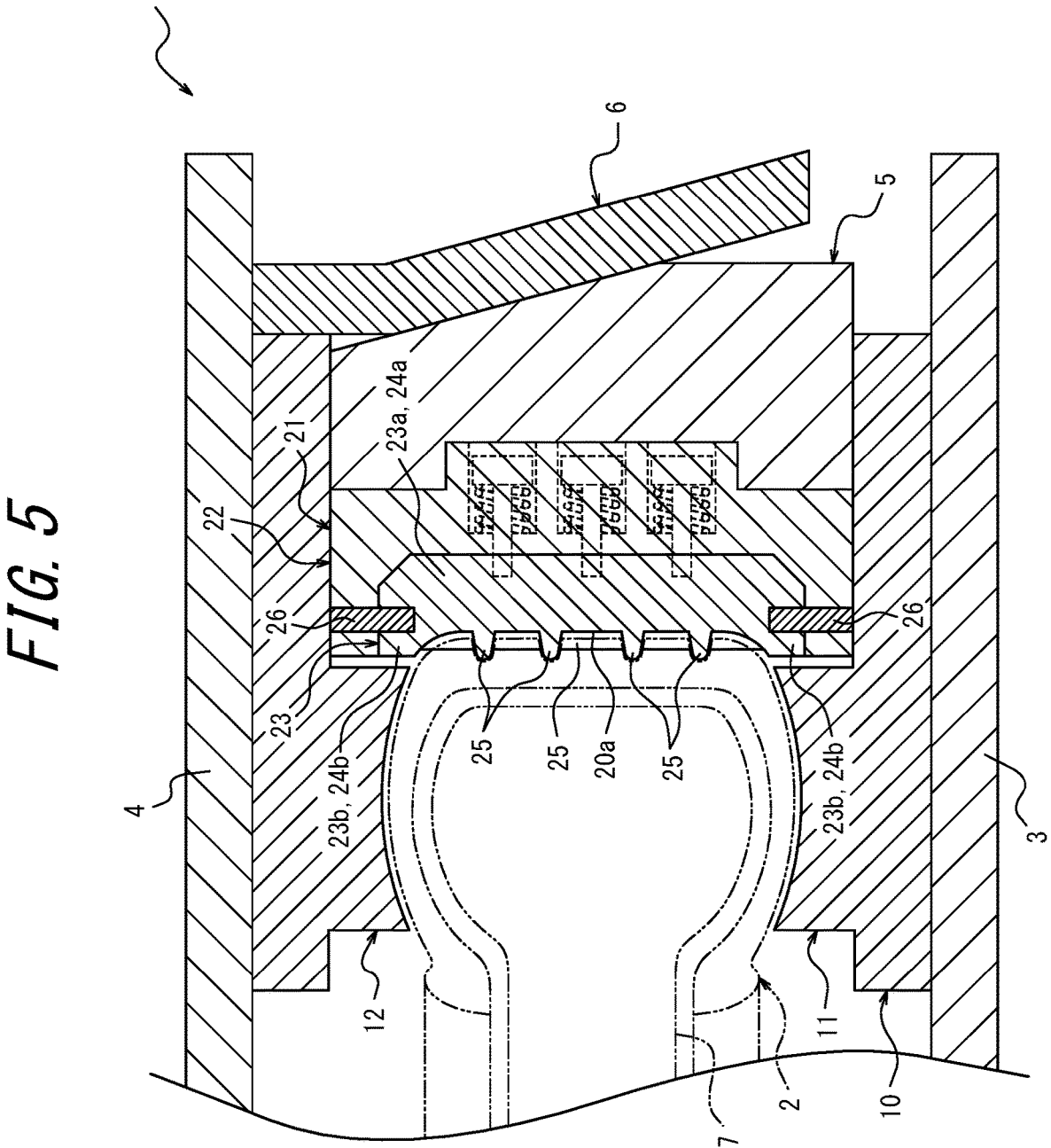
FIG. 5 is an enlarged cross-sectional view of detailed structure of the main portion of the mold for forming the tire illustrated in FIG. 1, which is illustrated in a front view.
Figure 6:
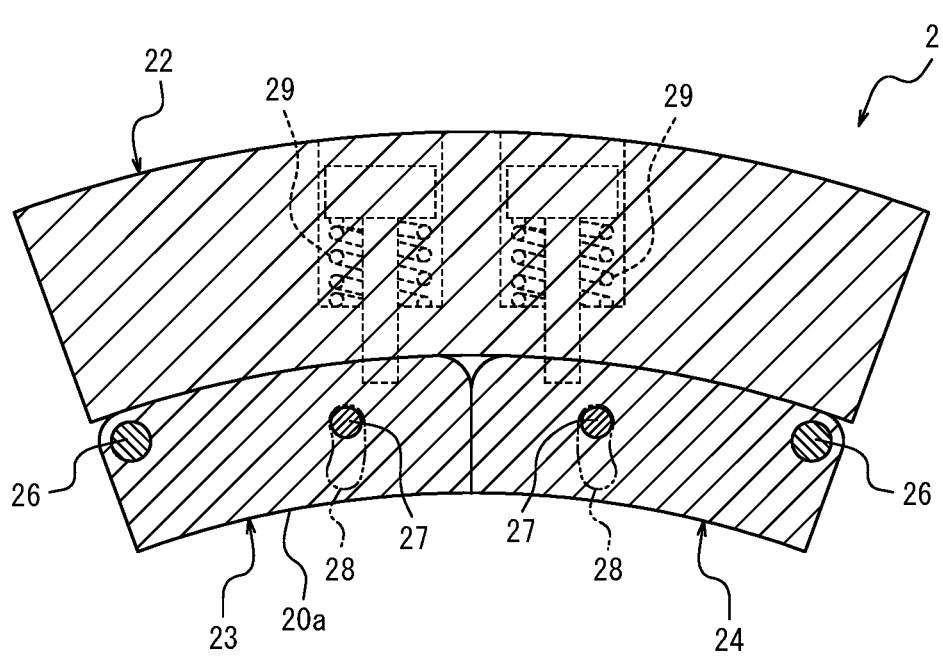
FIG. 6 is a cross-sectional view of one segment illustrated in FIG. 5 in a planar view.

As illustrated in FIGS. 5 and 6, in the mold for forming the tire 1 of this embodiment, each of the plurality of the segments 21 constituting the tread molding part 20 includes a plurality of design surface dividing mold parts 23, 24, and each of a plurality of design surface dividing mold parts 23, 24 is arranged in a circumferential direction of the segments 21. In this embodiment, each of the plurality of the segments 21 includes two design surface dividing mold parts 23, 24.

In this embodiment, each of the segments 21 includes a holder 22. The plurality of the design surface dividing mold parts 23, 24 are disposed in the radially inner side of the holder 22.

The holder 22 is a portion which is fixed to the intermediate container 5 and which is driven toward the radially outer side by the intermediate container 5 when tread molding part 20 is opened. When the tread molding part 20 is closed, the holder 22 is driven toward the radially inner side by the intermediate container 5. The holder 22 can be formed, for example, by cutting a block made of metal such as low carbon steel.

In this embodiment, the holder 22 is detachably fixed to the intermediate container 5. As a result of this, a plurality of types of segments 21 having mutually different shapes of the tread design surfaces 20a can be selectively attached to the intermediate container 5, and thus, the mold for forming a tire 1 is applicable in the production of a variety of types of tires 2 having mutually different tread patterns.

The two design surface dividing mold parts 23, 24 are portions which constitute a tread design surface 20a for forming the tread 2c of the tire 2. Each of the two design surface dividing mold parts 23, 24 is in the form of arc in a planar view and a surface oriented toward the radially inner side of the design surface dividing mold parts 23, 24 constitutes a circumferentially divided portion of the tread design surface 20a. The two design surface dividing mold parts 23, 24 are in contact with each other at end surfaces of the two design surface dividing mold parts 23, 24 in a circumferential direction. In other words, the tread design surface 20a of the tread molding part 20 is divided in a circumferential direction and provided on the design surface dividing mold parts 23, 24 provided on each of the plurality of segments 21. Therefore, the tread molding part 20 is divided into nine pieces in a circumferential direction, a tread design surface 20a is divided into 18 pieces in a circumferential direction.

As illustrated in FIG. 5, each of the tread design surfaces 20a provided on the design surface dividing mold parts 23, 24 is provided with a plurality of projections 25 which protrude in a radial direction from the tread design surface 20a toward the radially inner side. The plurality of the projections 25 are used to form, for example, grooves or sipes which constitute a tread pattern, on the tread 2c of the tire 2 in vulcanization molding. The plurality of the projections 25 can be of various shapes or sizes (length) tailored to the tread pattern, such as a plurality of projections 25 extending in a tire width direction and a plurality of projections 25 extending in a tire circumferential direction.

The design surface dividing mold parts 23, 24 are preferably formed by casting of a metal material having high thermal conductivity such as, for example, an aluminum alloy. In this case, for example, rib-shaped or blade-shaped projections 25 made of steel can be provided by integrating with the design surface dividing mold parts 23, 24 in casting of the design surface dividing mold parts 23, 24.

Each of the design surface dividing mold parts 23, 24 is supported by the rotatable shaft 26 parallel to an axis (central axis O) of the tread molding part 20 to be rotatable in relation to the holder 22. Each of the design surface dividing mold parts 23, 24 rotates around the rotatable shaft 26 in relation to the holder 22 when the tread molding part 20 is opened after vulcanization molding of the tire 2.

More particularly, each of the design surface dividing mold parts 23, 24 is supported by two rotatable shafts 26 parallel to an axis of the tread molding part 20, that is, two rotatable shafts 26 coaxial with each other disposed in a width direction of the tire 2 to be rotatable in relation to the holder 22. Each of the design surface dividing mold parts 23, 24 is configured to rotate, from a predetermined position toward a radially inner side, around the rotatable shaft 26 in relation to the holder 22. In this regard, the term "predetermined position" refers to a position at which each of the design surface dividing mold parts 23, 24 is in an orientation by which tread design surfaces 20a provided on the design surface dividing mold parts 23, 24 are continuously connected, in a circumferentially arranged manner, with each other. In the case as illustrated, the rotatable shafts 26 are divided into two pieces, one of which is for supporting the upper portions of the design surface dividing mold parts 23, 24 on the segment 21 and the other of which is for supporting the lower portions of the design surface dividing mold parts 23, 24 on the segment 21. However, instead of such the rotatable shafts 26, it is also possible to use one rotatable shaft 26 extending through the design surface dividing mold parts 23, 24.

The design surface dividing mold part 23 disposed on the side of one end of the segment 21 in a circumferential direction is preferably configured to be supported on the holder 22 by the rotatable shaft 26 at a position located one-sidedly on the side of one end of the segment 21 in a circumferential direction in relation to the center of the design surface dividing mold part 23 in the circumferential direction. Similarly, the design surface dividing mold part 24 disposed on the side of the other end of the segment 21 in a circumferential direction is preferably configured to be supported on the holder 22 by the rotatable shaft 26 at a position located one-sidedly on the side of the other end of the segment 21 in a circumferential direction in relation to the center of the design surface dividing mold part 24 in a circumferential direction.

In this embodiment, the rotatable shaft 26 corresponding to the design surface dividing mold part 23 disposed on the side of one end of the segment 21 in a circumferential direction is disposed on the side of one end of the holder 22 in a circumferential direction. The rotatable shaft 26 corresponding to the design surface dividing mold part 24 disposed on the side of the other end of the segment 21 in a circumferential direction is disposed on the side of the other end of the holder 22 in a circumferential direction. In other words, on the one hand, at a position closer to the side of one end of the holder 22 in a circumferential direction than the center of the design surface dividing mold part 23 in a circumferential direction, the design surface dividing mold part 23 is supported by the rotatable shaft 26 to be rotatable in relation to a holder 22. On the other hand, at a position closer to the side of the other end of the holder 22 in a circumferential direction than the center of the design surface dividing mold part 24 in a circumferential direction, the design surface dividing mold part 24 is supported by the rotatable shaft 26 to be rotatable in relation to the holder 22.

Also, in this embodiment, the two design surface dividing mold parts 23, 24 are shaped to include respective back board portions 23a, 24a and respective pairs of side board portions 23b, 24b extending from both ends of the respective back board portions 23a, 24a in the direction of the axis (central axis O) toward a radially inner side. The two design surface dividing mold parts 23, 24 are supported at the respective back board portions 23a, 24b by the rotatable shaft 26.

As illustrated in FIG. 6, pin members 27 are fixed to the design surface dividing mold parts 23, 24 at a predetermined distance from the rotatable shaft 26 in a radial direction of the rotatable shaft 26, and movement of the pin member 27 is limited by a slit 28 provided on the holder 22. As a result, the range of rotation of the design surface dividing mold parts 23, 24 around the rotatable shaft 26 is limited to a predetermined range. In this regard, the pin member 27 and the slit 28 may not be provided.

Figure 7:
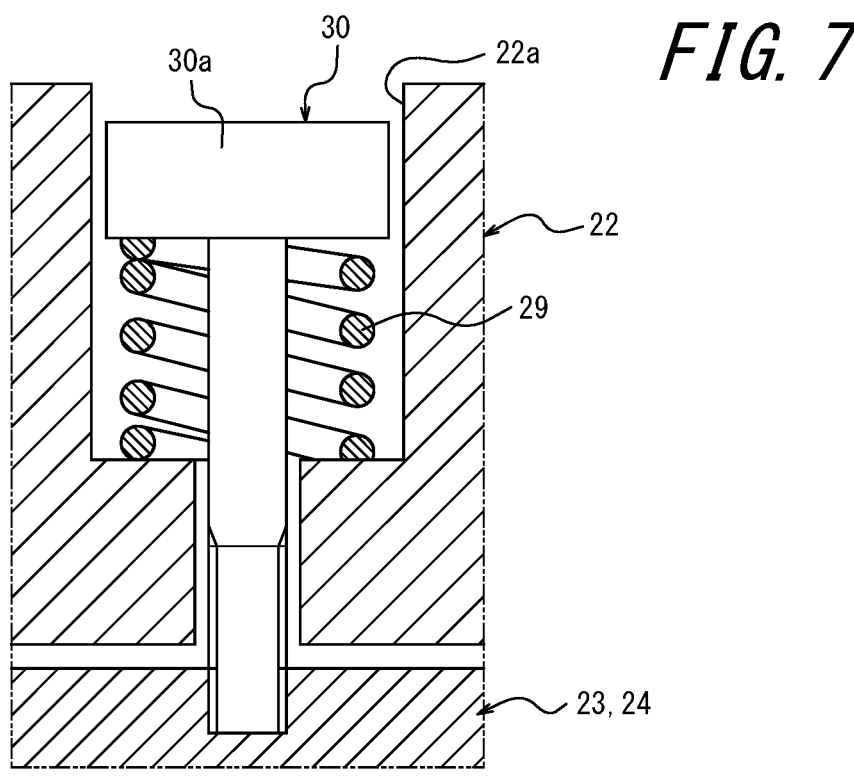
FIG. 7 is a cross-sectional view illustrating the details of the spring member illustrated in FIG. 6.

The tread molding part 20 can be configured to include spring members 29 which are attached between the design surface dividing mold parts 23, 24 and the holder 22 corresponding to the spring members 29 to retain the design surface dividing mold parts 23, 24 corresponding to the spring members 29 at predetermined positions, and elastically deform to allow for rotation of the design surface dividing mold parts 23, 24 in relation to the holder 22 when the tread molding part 20 is opened. As illustrated in FIG. 7, in this embodiment, a bolt 30 is fixed to the back surface of the design surface dividing mold parts 23, 24 and a spring member 29 is disposed between a head 30a of the bolt 30 disposed in a hole 22a provided in the holder 22 and a bottom wall of the hole 22a of the holder 22. The spring member 29 is a helical compression spring. The spring member 29 biases portions of the design surface dividing mold parts 23, 24 at a distance from the rotatable shaft 26 toward a direction in which the portion are attracted toward the holder 22. As a result, the spring member 29 retains the design surface dividing mold parts 23, 24 at a predetermined position, and when tread molding part 20 is opened, elastically deforms (compressive deformation) between the head 30a of the bolt 30 and the bottom wall of the hole 22a to allow for rotation of the design surface dividing mold parts 23, 24 in relation to the holder 22.

Next, a method for vulcanization molding of a raw tire to produce a tire 2 having a predetermined shape by using a mold for forming a tire 1 having the above-described configuration, that is, a tire production method as an embodiment of this disclosure will be described.

First of all, a sidewall molding part 10 and a tread molding part 20 are opened to dispose a raw tire in the interior of a mold for forming a tire 1, and subsequently, the sidewall molding part 10 and the tread molding part 20 are closed.

Next, a bladder 7 is expanded by supplying pressurized steam to the bladder 7 disposed in the interior of the raw tire. As a result, sidewalls of the raw tire are pressed against a lower sidewall design surface 11a and an upper sidewall design surface 12a of the sidewall molding part 10, respectively, and a tread is pressed against a tread design surface 20a of the tread molding part 20. In this situation, a heater is used to heat the sidewall molding part 10 and the tread molding part 20, and such heat causes vulcanization of the synthetic rubber constituting the raw tire to form a tire 2 having a predetermined shape.

After forming of the tire 2 is completed, the sidewall molding part 10 and the tread molding part 20 are opened to remove a formed tire 2.

Figure 8:
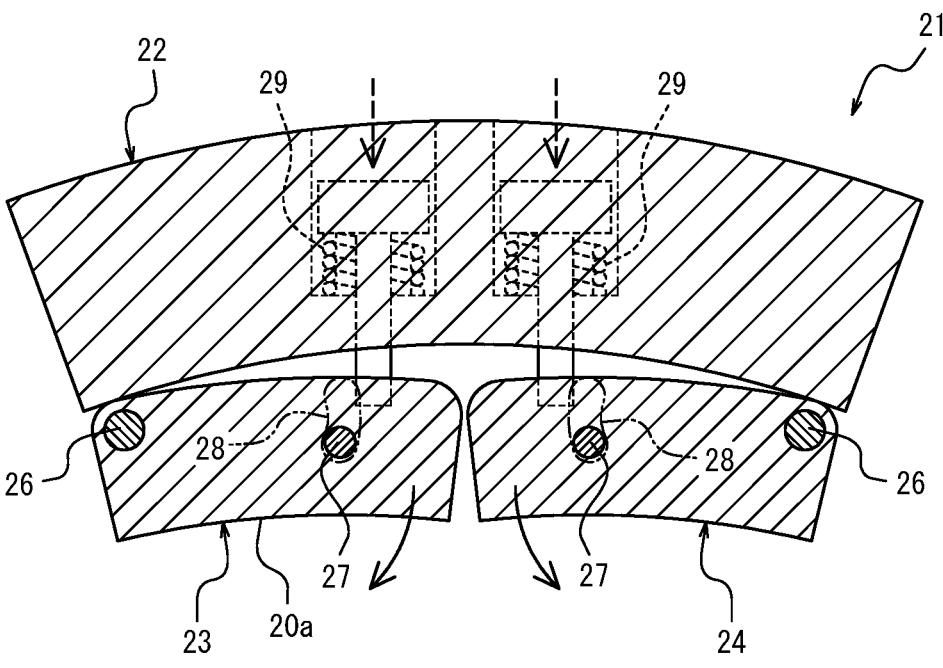
FIG. 8 is a cross-sectional view illustrating one segment illustrated in FIG. 5 in mold releasing of the tire, which is illustrated in a planar view.

When each of the segments 21 is moved toward the radially outer side to open the tread molding part 20 after vulcanization molding of the tire 2, driving force, which is required for resisting close contact of the tread 2c of the tire 2 with the inner circumferential surface of the tread design surface 20a and also for resisting undercut resistance caused between the tread 2c of the tire 2 and the projections 25, is applied to each of the design surface dividing mold parts 23, 24 by the medium of the holder 22. At this time, each of the two design surface dividing mold parts 23, 24 in each of the segments 21 is disposed at one side or the other side of the segment 21 or the holder 22 in a circumferential direction in a manner deviated from the center of the segment 21 or the holder 22 in a circumferential direction. Therefore, driving force is applied to each of the design surface dividing mold parts 23, 24 at a position which is deviated in a circumferential direction from the center of the holder 22 in a circumferential direction. As a result of this, when the tread molding part 20 after vulcanization molding of the tire 2, as illustrated in FIG. 8, each of the design surface dividing mold parts 23, 24 spontaneously rotates (panning action) around the rotatable shaft 26 in such a way that an end on the side adjacent to the center of the holder 22 in the circumferential direction is moved away from the holder 22 toward the radially inner side.

As described above, in the tire production method by using the mold for forming the tire 1 of this embodiment, when tread molding part 20 is opened after vulcanization molding of the tire 2, the tire 2 can be released from the tread molding part 20 with each of the design surface dividing mold parts 23, 24 being rotated around the rotatable shaft 26 parallel to an axis of the tread molding part 20. As a result of this, in mold releasing of the tire 2 from the tread molding part 20, each of the design surface dividing mold parts 23, 24 rotates to allow for the projections 25 to be in an orientation by which undercut resistance of the tread 2c of the tire 2 caused by the projections 25 is reduced. As a result, undercut resistance of the tread 2c caused by the projections 25 in mold releasing of the tire 2 can be reduced.

In particular, in this embodiment, the rotatable shaft 26 corresponding to the design surface dividing mold part 23 disposed on the side of one end of the segment 21 in a circumferential direction is disposed on the side of one end of the holder 22 in a circumferential direction. The rotatable shaft 26 corresponding to the design surface dividing mold part 24 disposed on the side of the other end of the segment 21 in a circumferential direction is disposed on the side of the other end of the holder 22 in a circumferential direction. Therefore, when tread molding part 20 is opened, each of the design surface dividing mold parts 23, 24 can be more reliably rotated in relation to the holder 22. In addition, each of the design surface dividing mold parts 23, 24 can be rotated in such a way that, on the sides of both ends of the holder 22 in a circumferential direction, at which especially high undercut resistance occurs, the projections 25 are in an orientation by which undercut resistance of the tread 2c of the tire 2 caused by the projections 25 is reduced. As a result of this, undercut resistance of the tread 2c caused by the projections 25 in mold releasing of the tire 2 can be reduced more effectively reduce.

Therefore, the mold for forming the tire 1 or the tire production method of this embodiment can suppress defects such as permanent deformation in the formed tread 2c of the tire 2 and the failure of the projections 25 caused by excessively high undercut resistance in mold releasing of the tire 2 from the tread molding part 20.

Also, by rotating each of the design surface dividing mold parts 23, 24, the tread 2c of the tire 2 is gradually released from the side of one end of each of the design surface dividing mold parts 23, 24 in a circumferential direction. As a result of this, outside air is gradually introduced between the tread design surface 20a and the tread 2c from the side of both ends of the tread design surface 20a and the tread 2c in a circumferential direction to allow for the tread 2c of the tire 2 in close contact with the tread design surface 20a to be peeled off more effectively from the tread design surface 20a. Therefore, the tire 2 can be released more easily from the tread molding part 20.

In addition, the mold for forming the tire 1 or the tire production method of this embodiment can reduce undercut resistance of the tread 2c caused by the projections 25 in mold releasing of the tire 2, and also, allows for the tread 2c of the tire 2 in close contact with the tread design surface 20a to peel off from the tread design surface 20a more effectively. Therefore, driving force applied to the segments 21 in mold releasing of the tire 2 can be reduced, and as a result, the entire production device including the mold for forming the tire 1 can be downsized to reduce the production costs.

In addition, the mold for forming the tire 1 or the tire production method of this embodiment can reduce undercut resistance of the tread 2c caused by the projections 25 in mold releasing of the tire 2. Therefore, a tire 2 having a more complex tread pattern can be produced relatively easily. As a result of this, flexibility in the production of a tire 2 having a complex tread pattern can be improved.

In the mold for forming the tire 1 of this embodiment, the rotatable shaft 26 corresponding to the design surface dividing mold part 23 disposed on the side of one end of the segment 21 in a circumferential direction is disposed on the side of one end of the holder 22 in a circumferential direction. The rotatable shaft 26 corresponding to the design surface dividing mold part 24 disposed on the side of the other end of the segment 21 in a circumferential direction is disposed on the side of the other end of the holder 22 in a circumferential direction. The two design surface dividing mold parts 23, 24 include respective back board portions 23a, 24a, and respective pairs of side board portions 23b, 24b extending from both ends of the respective back board portions 23a, 24a in the direction of the axis toward a radially inner side, and are supported at the respective back board portions 23a, 24b by the rotatable shaft 26. As a result, when the two design surface dividing mold parts 23, 24 are at a predetermined position, end surfaces of the two design surface dividing mold parts 23, 24 in the circumferential direction come in contact with each other to suppress the occurrence of burrs in the tread 2c of the tire 2 after the vulcanization molding. In addition, when the segments 21 are moved toward the radially outer side for mold releasing of the tire 2 from the tread molding part 20, each of the design surface dividing mold parts 23, 24 can spontaneously rotate in relation to the holder 22.

Also, in the mold for forming the tire 1 of this embodiment, the tread molding part 20 includes the spring members 29 which are attached between the design surface dividing mold parts 23, 24 and the holder 22 corresponding to the spring members 29 to retain the design surface dividing mold parts 23, 24 corresponding to the spring members 29 at a predetermined position, and when the tread molding part 20 is opened, elastically deforms to allow for rotation of the design surface dividing mold parts 23, 24 in relation to the holder 22. As a result, each of the design surface dividing mold parts 23, 24 is ensured to be retained at a predetermined position in vulcanization molding of a raw tire to improve the formability of the tire 2. In addition, when tread molding part 20 is opened after vulcanization molding of the tire 2, each of the design surface dividing mold parts 23, 24 can spontaneously rotate around the rotatable shaft 26 in relation to the holder 22. In consequence, undercut resistance of the tread 2c caused by the projections 25 in mold releasing of the tire 2 can be reduced.

Examples

As a mold for forming a tire of Example, a mold for forming a tire having the above-described configuration was employed in which:
  the design surface dividing mold part is made of an aluminum alloy (AC4C) and the difference between the maximum inner diameter and the minimum inner diameter is 35 mm;
  projections are made of stainless steel sheet (SUS304 H material) and has a thickness of 0.3 mm;
  a holder is made of low carbon steel (S45C equivalent material) by using a machining process;
  spring members deform by about 10 mm under application of a load of 100 kg; and
  when the segments are moved by 16 mm toward the radially outer side, each of design surface dividing mold part rotates by 5 degrees. The mold for forming the tire was used to form a tire with an inner diameter of 600 mm and a tire width of 255 mm, and external force (driving force to be applied to the holder) required for mold releasing of the tire was measured. As a result of this, in comparison with a mold for forming a tire of Comparative Example having a configuration in which the design surface dividing mold part is not rotated, it has been demonstrated that the mold for forming the tire of Example can reduce the external force by roughly 30%.

As a matter of course, this disclosure is not limited to the above-described embodiment and a variety of modifications are possible without departing from the scope of this disclosure.

For example, in the above-described embodiment, each of the plurality of the segments 21 includes two design surface dividing mold parts 23, 24; however, each of the plurality of the segments 21 may include three or more design surface dividing mold parts.

Also, in the above-described embodiment, each of the segments 21 is provided with the holder 22, the two design surface dividing mold parts 23, 24 are supported by the rotatable shaft 26 to be rotatable in relation to the holder 22. However, it is also possible that the holder 22 is not provided, and the two design surface dividing mold parts 23, 24 are supported on another member such as the intermediate container 5 by the rotatable shaft 26.

In addition, in the above-described embodiment, the holder 22 of the segment 21 is fixed to the intermediate container 5. However, the holder 22 can be integrated with the intermediate container 5.

REFERENCE SIGNS LIST

1 Mold for forming a tire
2 Tire
2a Sidewall
2b Sidewall
2c Tread
3 Lower container
4 Upper container
5 Intermediate container
5 Tapered surface
6 Outer ring
6a Tapered surface
7 Bladder
10 Sidewall molding part
11 Lower sidewall molding part
11a Lower sidewall design surface
12 Upper sidewall molding part
12a Upper sidewall design surface
20 Tread molding part
20a Tread design surface
21 Segment
22 Holder
22a Hole
23 Design surface dividing mold part
23a Back board portion
23b Side board portion
24 Design surface dividing mold part
24a Back board portion
24b Side board a portion
25 Projection
26 Rotatable shaft
27 Pin member
28 Slit
29 Spring member

12

30 Bolt
30a Head
O Central axis

The invention claimed is:

1. A mold for forming a tire for vulcanization molding of an unvulcanized raw tire into a tire, the mold comprising:
an annular tread molding part which is divided into a plurality of segments arranged in a circumferential direction and which is configured to be opened and closed by moving each of the segments in a radial direction, wherein
each of the segments includes:
a plurality of design surface dividing mold parts, each of the plurality of the design surface dividing mold parts includes a tread design surface for forming a tread of the tire, the plurality of the design surface dividing mold parts are arranged in the circumferential direction of the segments, and the plurality of the design surface dividing mold parts are configured to rotate around a rotatable shaft parallel to an axis of the tread molding part when the tread molding part is opened after vulcanization molding of the tire; and
a holder to be driven toward a radially outer side by a container when the tread molding part is opened,
each of the plurality of the design surface dividing mold parts is supported by the rotatable shaft to be rotatable in relation to the holder,
the mold further comprises two pieces of the design surface dividing mold parts, and
the rotatable shaft corresponding to one of the design surface dividing mold parts is disposed on a side of one end the holder in the circumferential direction, the rotatable shaft corresponding to the other of the design surface dividing mold parts is disposed on a side of the other end of the holder in the circumferential direction.

2. The mold for forming the tire according to claim 1, wherein
the design surface dividing mold part includes a back board portion, and a pair of side board portions extending from both ends of the back board portion in a direction of the axis toward a radially inner side, and is supported at the back board portion by the rotatable shaft.

3. A tire production method for vulcanization molding of an unvulcanized raw tire to produce a tire by using the mold for forming the tire according to claim 1, wherein
when the tread molding part is opened by moving each of the segments on the radially outer side, the tire is released from the tread molding part with each of the plurality of design surface dividing mold parts provided in the segments in a circumferentially arranged manner being rotated around the rotatable shaft parallel to the axis of the tread molding part.

4. A mold for forming a tire for vulcanization molding of an unvulcanized raw tire into a tire, the mold comprising:
an annular tread molding part which is divided into a plurality of segments arranged in a circumferential direction and which is configured to be opened and closed by moving each of the segments in a radial direction, wherein
each of the segments includes:
a plurality of design surface dividing mold parts, each of the plurality of the design surface dividing mold parts includes a tread design surface for forming a tread of the tire, the plurality of the design surface dividing mold parts are arranged in the circumferential direction of the segments, and the plurality of the design surface dividing mold parts are configured to rotate around a rotatable shaft parallel to an axis of the tread molding part when the tread molding part is opened after vulcanization molding of the tire; and a holder to be driven toward a radially outer side by a container when the tread molding part is opened, each of the plurality of the design surface dividing mold parts is supported by the rotatable shaft to be rotatable in relation to the holder, the annular tread molding part includes spring members which are attached between the plurality of the design surface dividing mold parts and the holder to retain the plurality of the design surface dividing mold parts at a predetermined position, and when the tread molding part is opened, the spring members elastically deform to allow for rotation of the plurality of the design surface dividing mold parts in relation to the holder.

5. A tire production method for vulcanization molding of an unvulcanized raw tire to produce a tire by using the mold for forming the tire according to claim 4, wherein when the tread molding part is opened by moving each of the segments on the radially outer side, the tire is released from the tread molding part with each of the plurality of design surface dividing mold parts provided in the segments in a circumferentially arranged manner being rotated around the rotatable shaft parallel to the axis of the tread molding part.

\* \* \* \* \*